INVENTOR.
L.W. POLLOCK
BY Hudson & Young
ATTORNEYS

Oct. 3, 1961 L. W. POLLOCK 3,002,293
PIPELINE NETWORK WITH FLOW RATE INDICATOR
AND CHEMICAL CONTENT ANALYZER
Filed June 12, 1958 3 Sheets-Sheet 2

INVENTOR.
L.W. POLLOCK
BY Hudson & Young
ATTORNEYS

United States Patent Office 3,002,293
Patented Oct. 3, 1961

3,002,293
PIPELINE NETWORK WITH FLOW RATE INDICATOR AND CHEMICAL CONTENT ANALYZER
Lyle W. Pollock, Bartlesville, Okla., assignor to Phillips Petroleum Company, a corporation of Delaware
Filed June 12, 1958, Ser. No. 741,588
4 Claims. (Cl. 35—18)

This invention relates to the analysis and control of pipeline networks.

In the petroleum industry it is common practice to transmit natural gasoline from a number of gasoline plants into a common pipeline network for delivery to one or more refineries. While it is desirable that the feed stream to the refineries be maintained at a relatively constant rate and composition, this often is difficult to accomplish for a number of reasons. Natural gasoline from as many as 50 or more plants may be delivered to a common pipeline network. The volumes of gasoline delivered by these individual plants often vary considerably and the outputs from individual plants may be either continuous or intermittent. Some of the plants may be owned by the refiner, while others may represent purchased gasoline, the exact composition of which is more difficult to control. Furthermore, such factors as seasonal changes of ambient temperature, the composition of the natural gas processed, and separation procedures result in differences in composition of the natural gasoline delivered to the pipeline network. Due to the fact that there may be a time lag as long as several days between deliveries of gasoline to the pipeline and removal of the gasoline at the refinery, it is difficult to schedule deliveries in response to a product analysis at the refinery.

In accordance with the present invention there is provided a pipeline network analyzer which is capable of simulating the operation of an actual pipeline network so that information is available which can be used to control deliveries to the pipeline. This analyzer comprises a small-scale model which is an analog of the actual pipeline network. A plurality of identifiable materials are added to the pipeline simulator in amounts representative of characteristic components of the natural gasoline which are added to the actual pipeline network by the several plants which supply the network. For example, the properties of natural gasoline can be determined in a reasonably accurate manner if the concentrations of propane, normal butane, isobutane and pentanes and heavier are known. Thus, four separate identifiable materials can be added to the simulator to represent the quantities of these four constituents at each gasoline plant. An analysis of the resulting mixture from the several plants indicates the composition of the natural gasoline being delivered to the refineries. It is then possible to utilize this information to schedule pipeline deliveries from the several plants in such a manner that the composition of the delivered gasoline remains substantially constant. Because of the relatively small size of the simulator, it is possible to obtain analyses immediately so that corrections in deliveries to the pipelines can be made in sufficient time to maintain the desired constant output.

Accordingly, it is an object of this invention to provide novel apparatus for analyzing the operation of pipeline gathering systems.

Another object is to provide a procedure for controlling deliveries to a pipeline gathering system so that the composition of the material delivered by the pipeline remains constant at a desired value.

Other objects, advantages and features of the invention should become apparent from the following detailed description which is taken in conjunction with the accompanying drawing in which.

Figure 2:
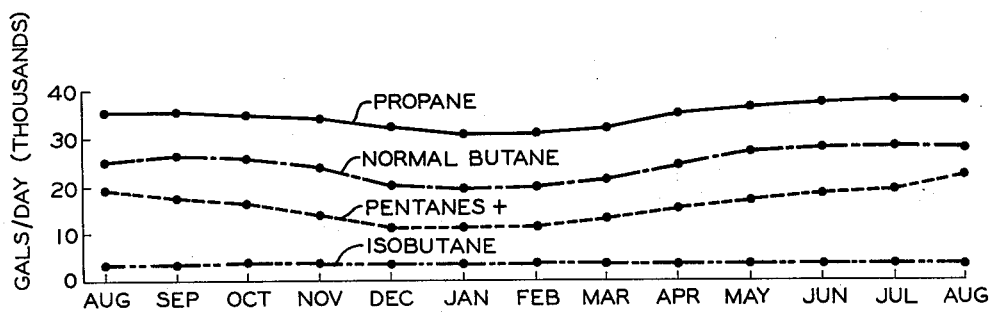
FIGURES 2, 3, 4, 5 and 6 are graphical representations of changes in the volumes of the constituents of natural gasoline delivered to a pipeline network by representative natural gasoline plants.
Figure 3:
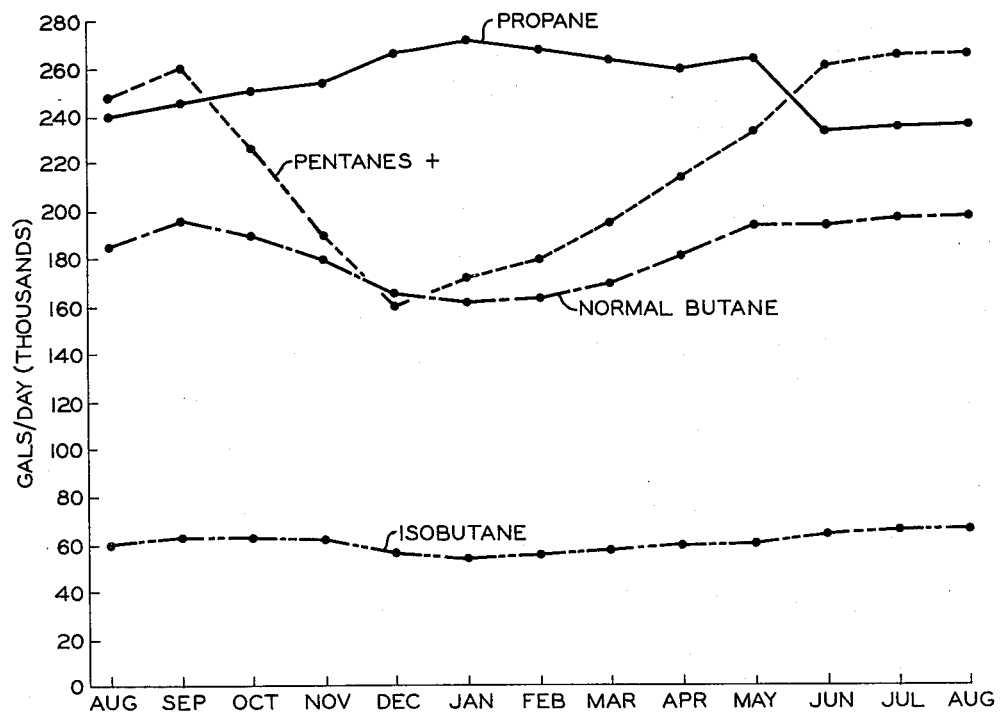
Figure 4:
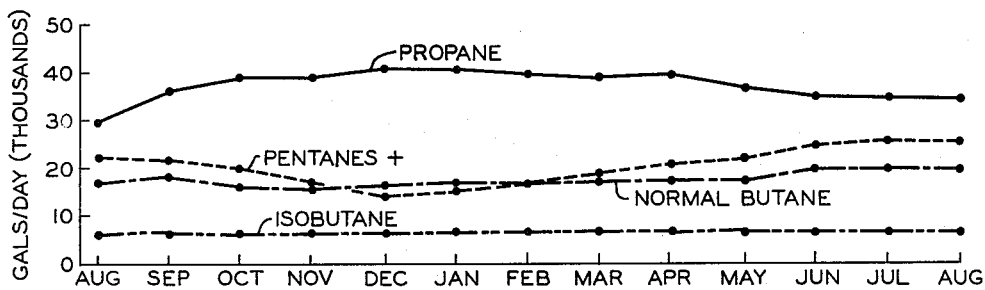
Figure 5:
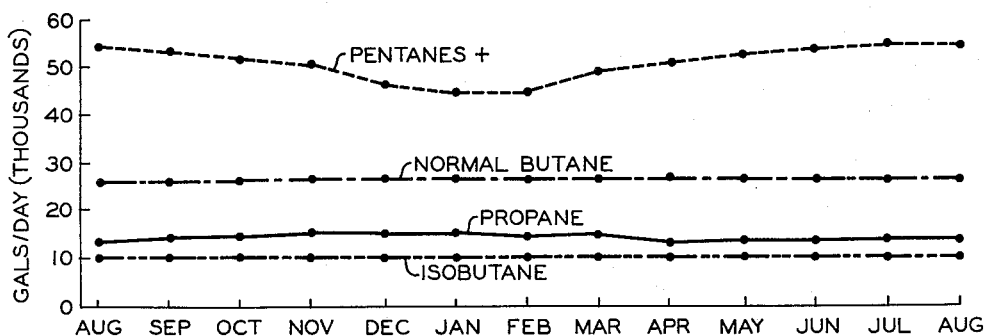
Figure 6:
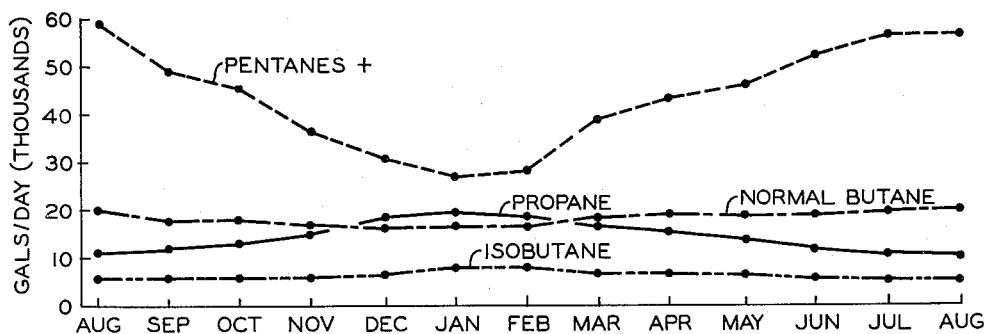

As previously mentioned, natural gasoline pipeline gathering networks often are supplied by as many as 50 or more natural gasoline plants. The volumes and compositions of the materials supplied by these individual plants often vary appreciably from one another and change due to differences in ambient temperature and other factors. This is represented graphically in FIGURES 2 to 6 which show seasonal fluctuations in the delivery rates of natural gasoline constituents from five representative natural gasoline plants. The plant represented by FIGURE 2, for example, delivers substantially constant amounts of the various constituents throughout the year. The plant represented by FIGURE 3 delivers substantially larger quantities of gasoline than does the plant of FIGURE 2, and the composition of gasoline from this second plant varies to a much greater degree during the year. This is particularly true with respect to the pentanes and heavier. The graphs of FIGURES 4, 5 and 6 further show that the outputs of individual plants differ substantially from one another.

Figure 1:
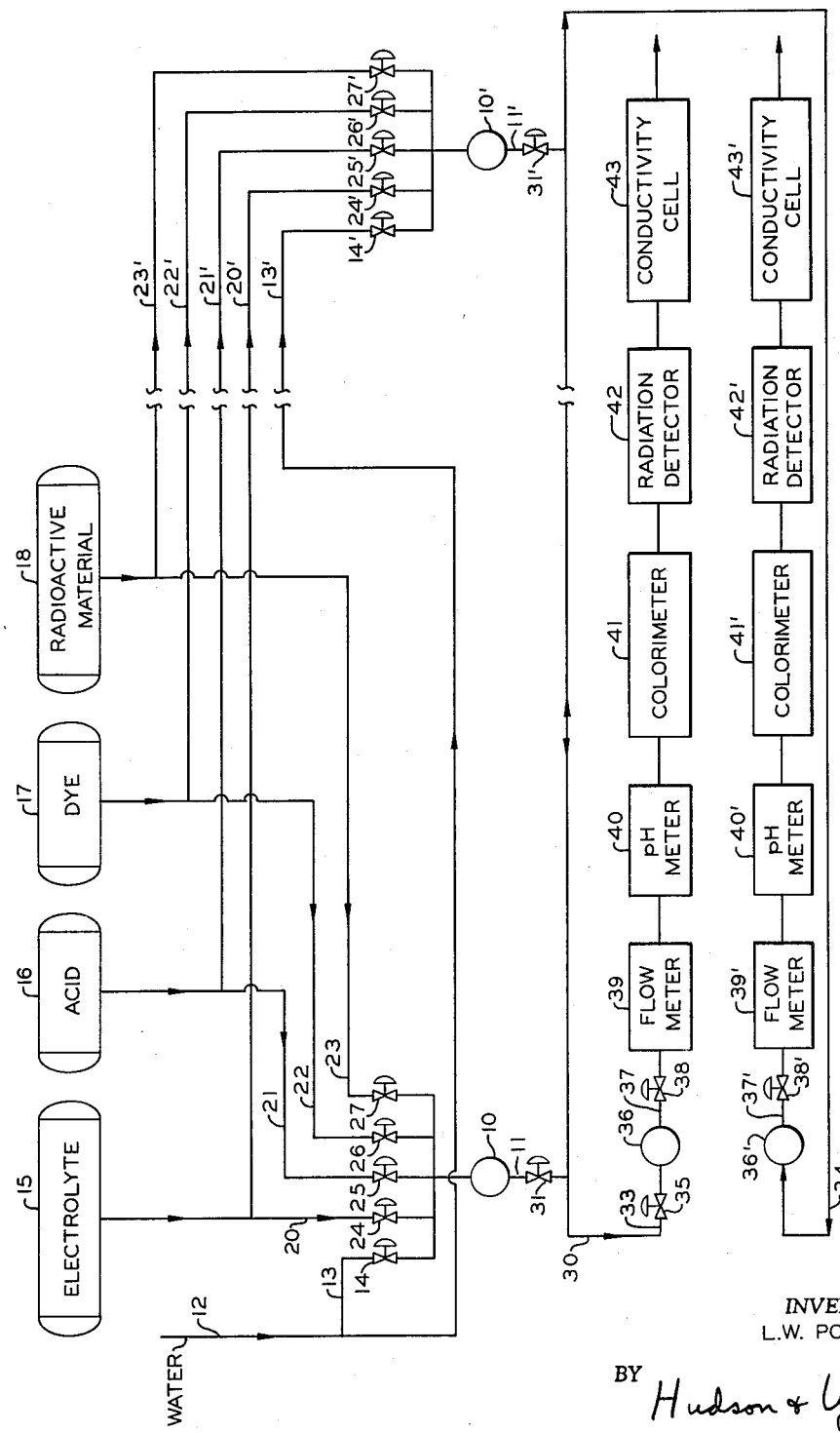
FIGURE 1 is a schematic representation of the pipeline network analyzer of this invention.

A preferred embodiment of the network analyzer of this invention is illustrated schematically in FIGURE 1 as comprising a conduit network which is an analog of the actual pipeline network. A storage tank 10 is connected at a conduit 11 to represent the surge tank at a first gasoline plant. Water is introduced into the system through a conduit 12. A conduit 13, which has a flow regulating valve 14 therein, communicates between conduit 12 and storage tank 10. The system is provided with a plurality of storage tanks 15, 16, 17 and 18 which contain materials that can be identified in the presence of one another. For example, tank 15 contains an electrolyte such as sodium chloride or any other salt which readily ionizes. Tank 16 contains a relatively weak organic acid which is soluble in water. Examples of two such acids are acetic and formic. Tank 17 contains a water soluble dye. Tank 18 contains a radioactive material which preferably is in the form of a water soluble salt of a radioactive material such as silver-110 chloride, for example. Tanks 15, 16, 17 and 18 are connected to storage tank 10 through respective conduits 20, 21, 22 and 23, the latter having respective flow control valves 24, 25, 26 and 27 therein.

Control valves 14, 24, 25, 26 and 27 are adjusted periodically in response to an actual analysis of the gasoline delivered to the pipeline network from one of the gasoline plants in the system. These valves are adjusted so that the total flow of liquid into storage tank 10 is representative of the total volume of gasoline delivered by the plant. The several identifiable materials from tanks 15, 16, 17 and 18 are added in amounts representative of the four constituents of the natural gasoline, as illustrated in one of the curves of FIGURES 2 to 6. For example, an amount of electrolyte is added to represent the volume of propane, an amount of acid is added to represent the volume of normal butane, an amount of dye is added to represent the amount of pentanes and heavier, and an amount of radioactive material is added to represent the volume of isobutane. Conduit 11 communicates between storage tank 10 and a conduit 30 which represents the pipeline to the refinery. Conduit 11 has a flow control valve 31 therein which regulates the flow from storage tank 10 to simulate the delivery of natural gasoline from the corresponding gasoline plant.

The analyzer of FIGURE 1 is provided with additional flow systems that are identical to the one thus far described. There are as many of these flow systems as there are natural gasoline plants in the actual pipeline network. One additional flow system is illustrated in FIGURE 1 wherein elements corresponding to those thus far described are designated by like primed reference numerals. Conduit 11' also communicates with conduit 30.

The apparatus of FIGURE 1 is designed to simulate the operation of a particular pipeline network wherein delivery from the gathering pipeline is made to two separate refineries. In this particular system, the first refinery has a relatively small storage capacity so that the gasoline is delivered to this refinery at approximately the rate at which it can be utilized. Any additional gasoline in the pipeline must be delivered to the second refinery. Opposite ends of conduit 30 of FIGURE 1 are connected to conduits 33 and 34 which represent pipelines leading to the individual refineries. Conduit 33, which has a flow control valve 35 therein, communicates with a storage tank 36 which simulates the storage capacity of the first refinery.

Liquid is removed from surge tank 36 through a conduit 37 which has a flow control valve 38, a flowmeter 39, a pH meter 40, a colorimeter 41, a radiation detector 42 and a conductivity cell 43 therein. These several analyzers are provided to measure the total amounts of the several identifiable materials which have been added to conduit 30 from the several units which represent the gasoline plants. The total flow indicated by meter 39 provides information regarding the total flow of natural gasoline delivered to the refinery. The signals provided by detectors 40, 41, 42 and 43 determine the composition of the delivered gasoline. From this information, it is possible for delivery rates from any given plant to be varied as required to maintain the composition of the delivered product at a desired value.

The flows through detectors 40, 41, 42 and 43 can be in parallel, rather than in series, or in any desired combination of series and parallel. Also, it should be evident that the determinations made in detectors 40, 41, 42 and 43 can be made on small samples removed from the main flow stream, if desired.

A similar detecting system is provided in conjunction with conduit 34, and corresponding elements are designated by like primed reference numerals. It should be evident that the illustrated detectors can be conventional instruments which are available commercially. While the acid and small amounts of radioactive salts have some effect on the electrical conductivity of the resulting solution, this effect is relatively small compared to the effect exerted by the strongly ionized electrolyte from tank 15. The resulting accuracy of the measurements is sufficient for practical operations.

It should be evident that the necessary pumps to move the liquids can be added to the simulator of FIGURE 1. These pumps preferably correspond to the pumps in the actual pipeline network. The pumps have been omitted from FIGURE 1 to simplify the drawing. It should also be evident that water supply conduit 12 can be omitted in some applications by supplying all of the desired liquid from tanks 15, 16, 17 and 18.

While four specific identifiable materials have been described for purposes of illustration, it should be evident that other systems can be employed for this purpose. For example, a radioactive material which emits beta rays can be utilized to represent one constituent and a radioactive material which emits gamma rays can be utilized to represent a second constituent. Two separate radiation detectors are then employed in conduit 37. The first of these detectors is exposed directly to the liquid and measures both the beta and gamma rays. The second detector is provided with a shield of sufficient thickness to block the beta rays. The second detector thus indicates the gamma rays, and the differences between the two detectors provides an indication of the beta rays. Another system which can be employed involves insulating all the conduits to prevent heat loss. The liquid added to simulate one of the gasoline constituents is then heated by an amount representative of this constituent. The temperature in conduit 37 thus represents the total addition of this constituent. Another possible system involves adding small solid particles to the liquid to simulate one of the constituents. These particles are subsequently filtered from conduit 37 and weighed to determine the total addition. This operation should be performed upstream from colorimeter 41 in order that the presence of the particles will not influence the light transmission at the colorimeter. It should thus be evident that a number of different types of identifiable substances can be utilized in the analyzer of this invention.

From the analyses provided by the apparatus of this invention it is possible to control deliveries by the actual gasoline plants to maintain the desired composition in the pipeline. For example, if the analyses indicate that a product containing lighter hydrocarbons is desirable, the deliveries from the plants of FIGURE 3 or 4 can be increased. If a heavier product is desired, deliveries from the plants of FIGURE 5 or 6 can be increased.

It should be evident that the sizes of the conduits of the analyzer of this invention are in the same ratio as the sizes of the conduits in the actual pipeline network. Also, the spacings between different stations of the analyzer must be in the same ratio as the corresponding spacings in the actual pipeline network.

While the invention has been described in conjunction with present preferred embodiments, it should be evident that it is not limited thereto.

What is claimed is:

1. Apparatus for simulating the operation of a pipeline gathering network which comprises a pipeline network analyzer comprising a first conduit means in an analog relationship to the pipeline to be simulated, a source of a first material, a source of a second material, said first material being representative of a first component in said pipeline, said second material being representative of a second component in said pipeline, said materials being each identifiable in the presence of the others, storage vessels for each of the materials representative of the components in the pipeline, second conduit means communicating between said first conduit means and said storage vessels and means in said second conduit means to permit introduction of said materials selectively into said first conduit at a first point, third conduit means communicating with said second conduit means and provided with means to allow additional selective introduction of said materials to said first conduit means at a second point, and analyzing means positioned in said conduit to measure said first and second materials representative of the components in said pipeline.

2. The apparatus of claim 1 further comprising a source of liquid, fourth conduit means communicating between said source of liquid and said first conduit means adjacent said first point to permit introduction of liquid into said first conduit means, fifth conduit means communicating between said source of liquid and said first conduit means to permit introduction of liquid into said first conduit means and flow measuring means positioned in said first conduit to indicate flow of liquid through said first conduit means.

3. The apparatus of claim 2 wherein said sources of material contain respectively a member selected from the group consisting of an electrolyte, a dye, a radioactive material and an organic acid, and wherein said analyzing means is selected from the group consisting of an electrical conductivity measuring means, a colorimeter, a radiation detector and a pH meter.

4. A method of simulating the operation of a pipeline gathering network which comprises introducing a multiplicity of different materials into a fluid flow zone at a location adjacent the inlet of said zone, said zone being of an analog relationship to the pipeline gathering network to be simulated, said materials being identifiable materials representative of components of fluid mixtures added to the pipe line gathering network to be simulated, flowing said materials introduced through said fluid flow zone and subsequently analyzing the fluid flow at a location adjacent the outlet of said fluid flow zone so as to provide measurements of the total amounts of the several different materials introduced and thereby obtaining measurements indicative of the composition of the pipeline operation to be simulated.

References Cited in the file of this patent

UNITED STATES PATENTS

| | | |
|---|---|---|
| 2,005,036 | Howe | June 18, 1935 |
| 2,063,140 | Allison | Dec. 8, 1936 |
| 2,231,500 | Harlow | Feb. 11, 1941 |
| 2,641,271 | Pressler | June 9, 1953 |
| 2,881,235 | Van Pool | Apr. 7, 1959 |